Aug. 31, 1937.                G. W. BUNGAY                2,091,253
              METHOD AND APPARATUS FOR MAKING MATRICES
                    Filed June 26, 1935        5 Sheets-Sheet 2

INVENTOR.
George W. Bungay
BY Wm. S. Pritchard
ATTORNEY.

Aug. 31, 1937.　　　　G. W. BUNGAY　　　　2,091,253
METHOD AND APPARATUS FOR MAKING MATRICES
Filed June 26, 1935　　　5 Sheets-Sheet 5
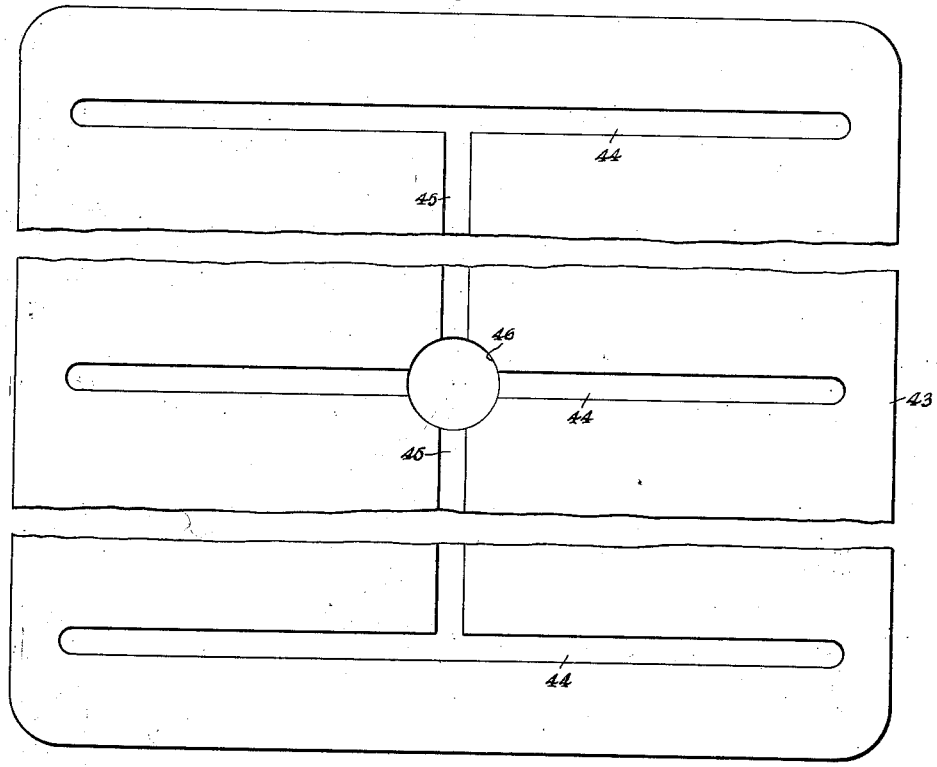
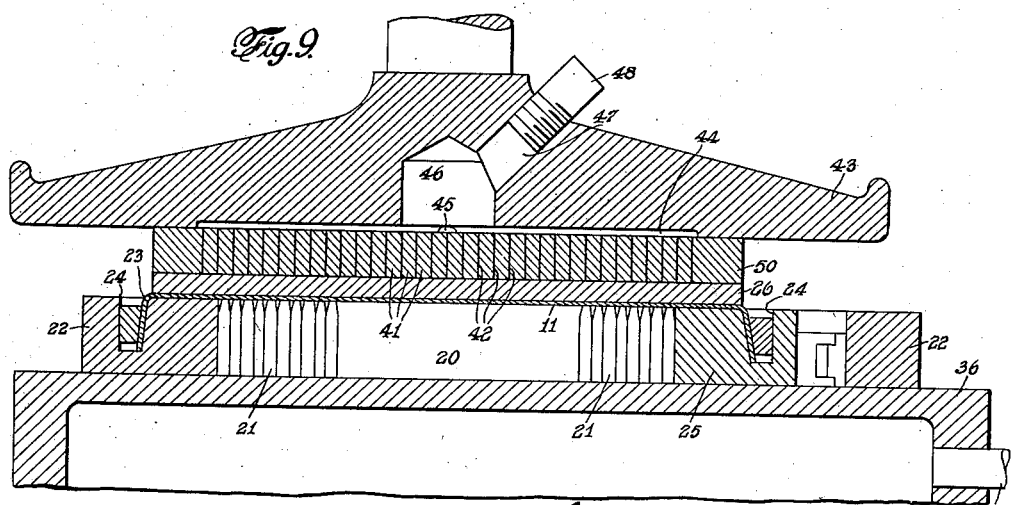
INVENTOR.
George W. Bungay
BY Wm. S. Pritchard
ATTORNEY.

Patented Aug. 31, 1937

2,091,253

UNITED STATES PATENT OFFICE 2,091,253

METHOD AND APPARATUS FOR MAKING MATRICES

George W. Bungay, Brooklyn, N. Y., assignor to Bungaytype-Delaware, Inc., New York, N. Y., a corporation of Delaware Application June 26, 1935, Serial No. 28,440

9 Claims. (Cl. 101—12)

This invention relates to a method and apparatus for making matrices for use in the casting of stereotype plates and more particularly to a vacuum plate for applying suction to the matrix during the drying thereof.

An object of the invention is to improve the step of drying the matrix.

Another object is to shorten the drying time so as to increase the capacity of the drying press.

A further object is to provide a cheap, simple, efficient and convenient device for the above purpose.

Various other objects will be apparent as the nature of the invention is more fully disclosed.

A feature of the invention consists in providing a heavy vacuum plate which has sufficient weight to hold the matrix in position on the form while the form is being shifted from the matrix press to the drying press. In one embodiment, the plate is provided with a plurality of channels adapted to distribute the suction over the matrix. The channels communicate with a suction port in the platen of the drying press. The press is preferably heated so as to vaporize the moisture in the matrix and to facilitate the removal thereof.

Other features consist in the various details of construction and combinations of parts hereinafter more fully set forth.

The broader aspects of the invention will be better understood by referring to the embodiments thereof which are set forth by way of illustration in the following description and are shown in the accompanying drawings in which:

Figure 8 is a broken, bottom plan view of the top platen of a drying press adapted to receive the vacuum frame of Figure 6; and Figure 9 is a vertical section showing the vacuum frame of Figure 6 assembled with the matrix and printing form in a drying press.

In the following description and in the claims certain specific terms are used for convenience in referring to various details of the invention. These terms, however, are to be interpreted as broadly as the state of the art will permit.

Figure 1:
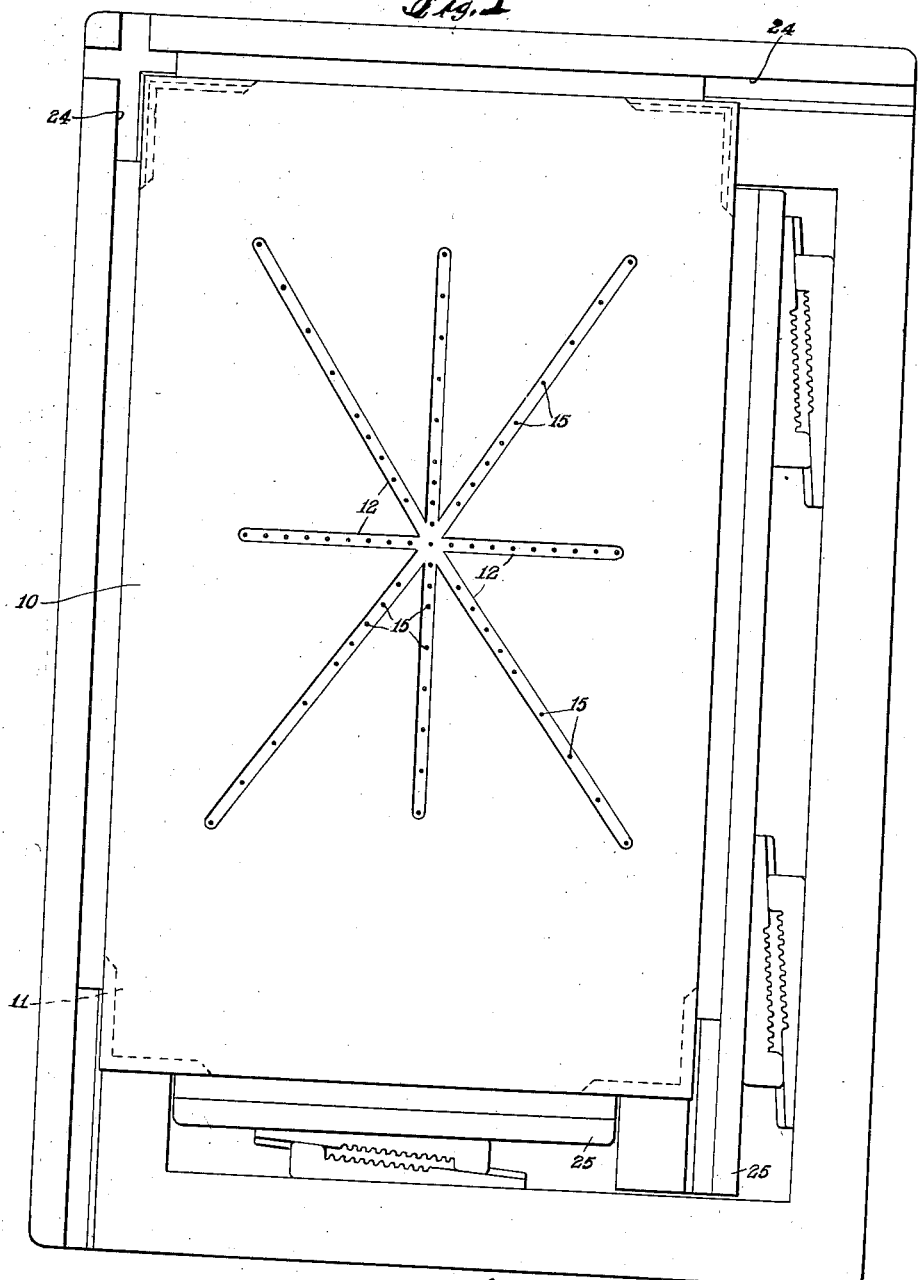
Figure 1 is a top plan view of the vacuum plate in position on a form.
Figure 2:
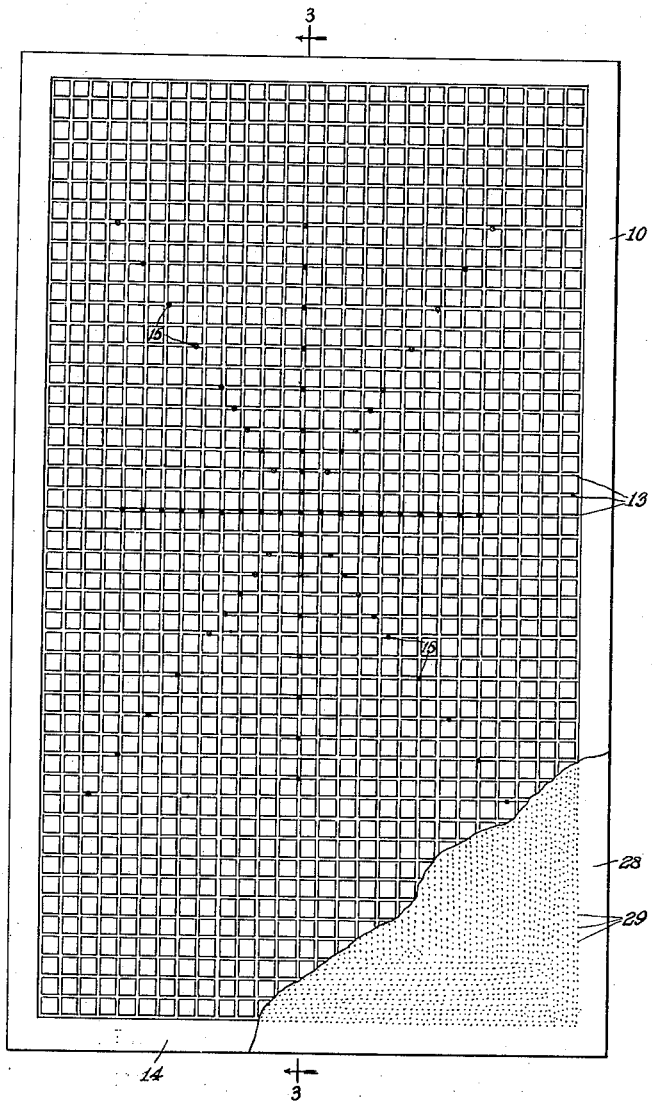
Figure 2 is a bottom plan view of the vacuum plate.
Figure 3:
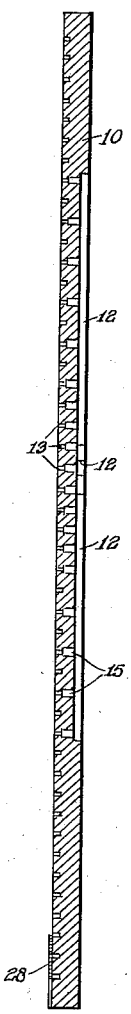
Figure 3 is a section taken along line 3—3 of Figure 2.

Referring to the drawings more in detail, a flat vacuum plate 10 is shown which is substantially coextensive with a matrix 11. The plate 10 is preferably formed of a metal, such as iron or lead, and is sufficiently heavy to hold the matrix under pressure when the form is removed from the matrix press. The plate 10 may have a set of radial channels 12 formed in the upper surface thereof (Figures 1 and 3) and a set of longitudinal and transverse channels 13 (Figures 2 and 3) formed in the lower surface thereof. The channels 13 terminate short of the sides of the plate so that an unbroken rim 14 extends around the entire plate. The channels 13 may be formed, for example, by sawing slots in the bottom of the plate 10 and filling the outer portions thereof, as by solder, to form the rim 14. The channels 12 and 13 may be interconnected by a plurality of transverse bores 15.

In making a matrix, the moist matrix paper is placed on a form 20 (Figures 4 and 5) comprising type elements 21 locked in a chase 22. The matrix may, for example, have side flaps 23 which are locked in grooves 24 in the chase and in floating bearers 25 so as to hold the matrix paper under tension on the form, as shown more in detail in my copending application Serial No. 714,916, filed March 10, 1934 for Matrix and method and apparatus for making the same.

A soft backing 26, such as a heavy felt, and several layers of absorbent material 27, such as blotting paper, may be placed on the matrix. A perforated plate 28 of material, such as brass, having a plurality of fine perforations 29, may be placed over the absorbent material 27, or the absorbent material may be omitted and the plate 28 may be placed directly over the soft backing 26.

The vacuum plate 10 is then placed on the plate 28 and the assembly is put in a matrix press (not shown) in which the necessary pressure is applied to make the desired impressions in the matrix. In order to cause the matrix to set in a flat condition as to retain the impressions therein, it is desirable to remove the moisture while the matrix is still under pressure on the form. At the same time it is desirable to release the expensive matrix press as soon as possible.

In accordance with the present invention the form, with the matrix, the backing material, the plate 28, and the plate 10 still thereon, is removed from the matrix press. A gasket 30 having a central aperture 31 is positioned over the plate 10, and the assembly is put in a drying press having a top platen 35 and a lower platen 36, preferably heated as by a steam supply pipe 37.

The top platen 35 may have a port 38 formed therein which registers with the aperture 31 of the gasket 30 and communicates with the channels 12 at about their point of intersection. A duct 39 may communicate with the port 38 and may be tapped to receive a suction hose 40.

Suitable pressure is applied by the drying press to hold the matrix in the desired condition while drying. Heat may be supplied to the lower platen 36, as from the supply pipe 37, and suction is applied through the hose 40 from a suitable suction pump (not shown). The hose 40 communicates with the recess 38 of the top platen 35, thence through the aperture 31 of the gasket 30 to the channels 12, the bores 15, the channels 13, and the apertures 29, by which it is distributed over the surface of the backing material. The heat and reduced pressure force the moisture out of the matrix 11 in a comparatively short time.

It is to be noted that the frame 10 remains on the matrix assembly during the entire process and serves, by its weight, to keep the matrix under sufficient pressure while changing the form from the matrix press to the drying press, to retain the registration with the various type faces. This is important as the registration of fine matter, such as half-tone dots, could not be restored if it were once lost as by the matrix springing away from the type matter when the form is taken from the matrix press.

The drying press may have a much smaller capacity than the matrix press, because it is only necessary to exert sufficient pressure on the matrix thereby to retain its form during the drying operation. Hence the drying press is cheaper than the matrix press and may be used to release the latter for impressing a greater number of matrices. It is contemplated that several drying presses may be used with a single matrix press for making perhaps a thousand matrices a day. The pressing operation requires less than a minute and the drying time may be shortened to about 10 minutes by removing the moisture at a reduced pressure as set forth above.

It is to be noted that the gasket 30 seals the top of the vacuum plate to the top platen 35 and prevents leakage of air therebetween. The suction is thus confined to the channels 12 by which it is evenly distributed to the lower channels 13. The latter communicate with the backing material to apply the suction over the surface thereof. The rim 14 serves as a seal to prevent leakage of air under the plate 10. Obviously, the plate 10 should correspond in size to the matrix, because if the plate 10 were smaller the suction would not be applied over the entire surface thereof and if the plate were larger leakage of air would take place into the exposed portions of the channels 13 and would prevent building up the necessary vacuum.

The plate 10, in addition to distributing the vacuum over the backing material, constitutes a weight which permits the form to be removed from the matrix press and placed in the drying press without loss of registration of the matrix with the printing surfaces. In some instances it may be desirable to dry in the matrix press, in which case the platen of the matrix press will be provided with a suitable port for applying suction to the vacuum plate and provision may be made for heating the same if desired. The plate 10 could also be made of lighter material as it would not be used for holding the matrix under pressure when taken from the press.

The perforations 29 may be sufficiently small to prevent the backing material from being drawn into the same and clogging the perforations. They should also be sufficiently small to prevent leaving any substantial impression thereof in the backing material, particularly when applied directly to the soft backing 26. Obviously, the plate 28 may be omitted provided the channels 13 are sufficiently narrow for the above purpose.

In the modification shown in Figures 6 to 9, the vacuum plate is made with extremely thin channels, such, for example, as of the order of .001 to .002 of an inch, so as to prevent distortion of the soft backing material. The vacuum plate may be made by using the frame 50 of a standard chase (Figure 6) and securing, as by welding, a set of bars 41 therein with a spacing of, for example, .001 to .002 of an inch to form channels 42 therebetween. After the bars 41 are secured in place, the upper and lower surfaces may be machined to substantially plane surfaces.

The top platen 43 of the drying press may have a set of transverse channels 44 formed in its lower surface, communicating by a longitudinal channel 45 with a port 46. The port 46 may communicate with a duct 47 which may be tapped to receive a pipe 48 leading to the source of suction (not shown). The transverse channels 44 are adapted to extend across the bars 41 so as to communicate with the various channels 42 formed therebetween.

Figure 4:
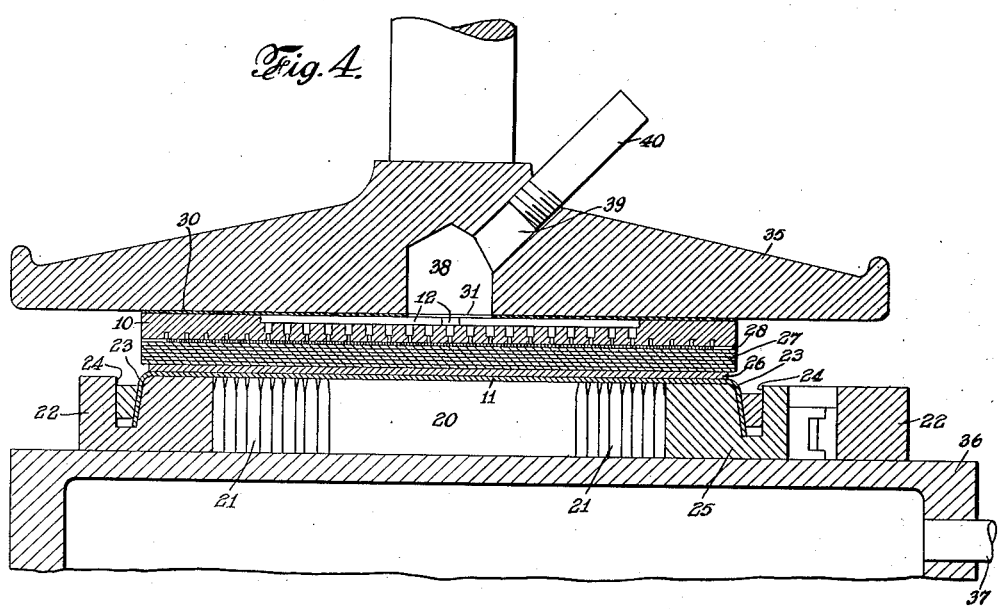
Figure 4 is a vertical section showing the parts assembled in a drying press.
Figure 5:
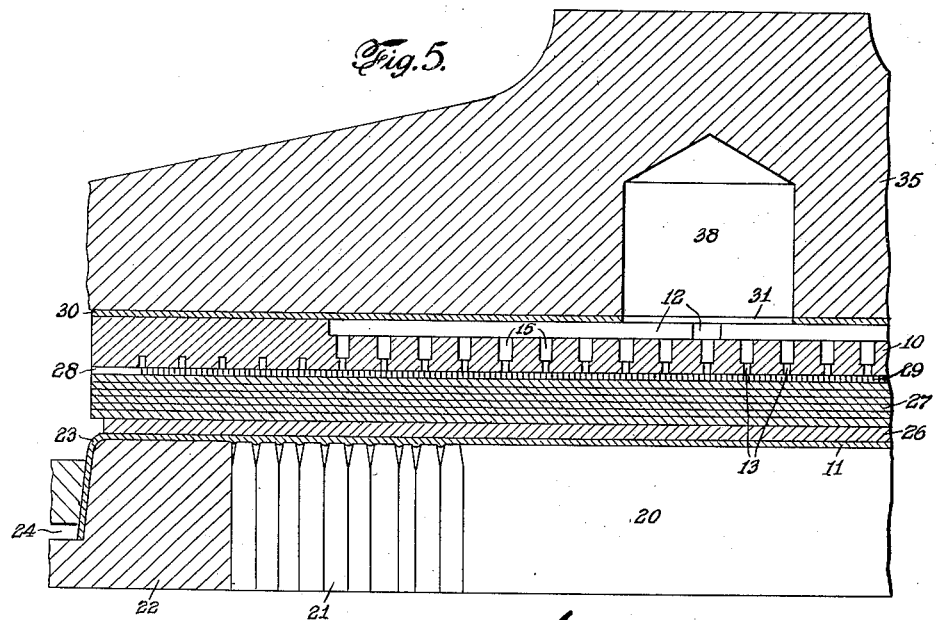
Figure 5 is an enlarged section, similar to that of Figure 4, showing a portion of the assembly.
Figure 6:
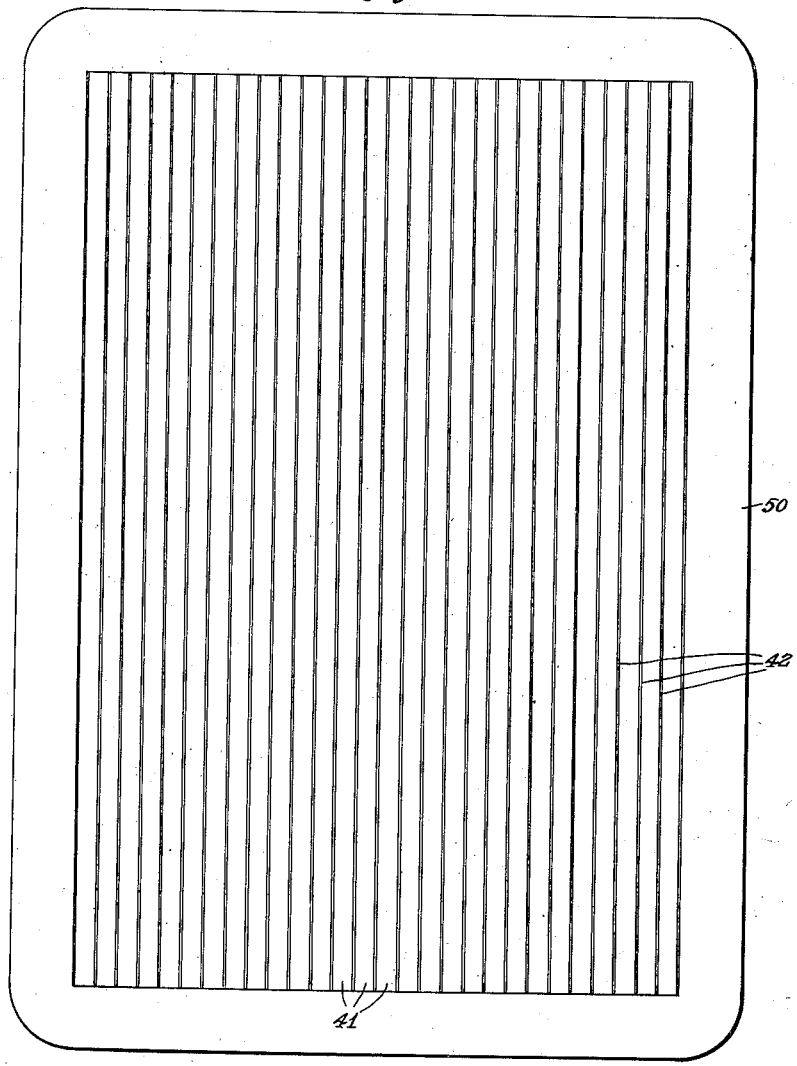
Figure 6 is a plan view of a modified form of vacuum plate.
Figure 7:
Figure 7 is a section taken on the line 7—7 of Figure 6.

In this embodiment, the printing form is arranged with the matrix 11 and backing 26 thereon as described in connection with Figures 4 and 5. The vacuum plate shown in Figures 6 and 7 is placed on the backing 26, the assembly is put in a matrix press, and pressure is applied to impress the type faces in the matrix. The substantially plane surface of the vacuum frame and the thinness of the channels 42 cause the top of the backing 26 to remain substantially flat.

The assembly is then removed from the matrix press and placed in the drying press with the transverse channels 44 in the top platen 43, communicating with the channels 42 between the bars 41, and pressure and suction is applied as described above for drying the matrix. Obviously, additional backing material similar to the backing material 27 of Figures 4 and 5 may be used if desired.

In this embodiment, much thinner channels 42 are obtained than in the embodiment of Figures 1 to 5. It is to be understood, however, that the action is otherwise similar. The channels 44 may be formed in the vacuum frame or in the top platen 43 as desired. The thin channels 42 are adapted to prevent appreciable distortion of the soft backing material so that a minimum of dressing is required before using the matrix.

Although certain specific embodiments have been shown for purposes of illustration, it is obvious that various changes and substitutions may be made therein without departing from the scope of the invention, which is only to be limited in accordance with the following claims when interpreted in view of the prior art.

I claim:

1. In an apparatus for making matrices comprising in combination a printing form on which a matrix paper and a soft backing material are to be placed in superposed relationship, a plate on the backing material adapted to cooperate with a platen of the matrix press and a platen of the drying press, said plate being of a weight to keep the matrix under sufficient pressure to permit transferring the form and matrix from the matrix press to the drying press without loss of registration of the matrix and printing surfaces, said plate having means adapted to be connected to a source of suction, and means to distribute the suction over the surface of the backing material so as to withdraw moisture therefrom.

2. In an apparatus for making matrices comprising in combination a printing form on which a matrix paper and a soft backing material are to be placed in superposed relationship, a plate on the backing material adapted to cooperate with a platen of the matrix press and a platen of the drying press, said plate being of a weight to keep the matrix under sufficient pressure to permit transferring the form and matrix from the matrix press to the drying press without loss of registration of the matrix and printing surfaces, said plate corresponding in size to said matrix and having means adapted to be connected to a source of suction, and means to distribute the suction over the surface of the backing material so as to withdraw moisture therefrom.

3. In an apparatus for making matrices comprising in combination a printing form on which a matrix paper and a soft backing material are to be placed in superposed relationship, a plate on the backing material adapted to cooperate with a platen of the matrix press and a platen of the drying press, said plate being of a weight to keep the matrix under sufficient pressure to permit transferring the form and matrix from the matrix press to the drying press without loss of registration of the matrix and printing surfaces, said plate having channels to communicate with the upper surface of said backing material and having means to seal the same to prevent leakage of air around the edges of the backing material.

4. In an apparatus for making matrices comprising in combination a press having a top platen, a printing form on which a matrix paper and a soft backing material are to be placed in superposed relationship, a plate over said backing material having suction distributing channels, and a port in said platen communicating with said channels so as to apply suction thereto when the press is exerting pressure on the matrix, said plate being adapted to cooperate with a platen of the matrix press, said plate being of a weight to keep the matrix under sufficient pressure to permit transferring the form and matrix from the matrix press to the drying press without loss of registration of the matrix and printing surfaces.

5. In an apparatus for making matrices comprising in combination a press having a top platen, a printing form on which a matrix paper and a soft backing material are to be placed in superposed relationship, a plate over said backing material, said plate having a set of bottom channels registering with the backing material and upper distributing channels communicating therewith, and a port in said platen communicating with said upper channels so as to apply suction thereto when the press is exerting pressure on the matrix, said plate being adapted to cooperate with a platen of the matrix press, said plate being of a weight to keep the matrix under sufficient pressure to permit transferring the form and matrix from the matrix press to the drying press without loss of registration of the matrix and printing surfaces.

6. In an apparatus for making matrices comprising in combination a printing form on which a matrix paper and a soft backing material are to be placed in superposed relationship, a plate on said backing material having open interconnected channels on the upper and lower faces thereof, the lower channels being adapted to distribute suction over the area of the backing material, a gasket on said plate closing the upper channels, said gasket having a central aperture to provide a passage communicating with the upper channels, and a press having an upper platen provided with a port registering with said aperture and having means to connect said port to a source of suction whereby suction may be applied to the matrix while in the press, said plate being adapted to cooperate with a platen of the matrix press, said plate being of a weight to keep the matrix under sufficient pressure to permit transferring the form and matrix from the matrix press to the drying press without loss of registration of the matrix and printing surfaces.

7. A vacuum plate for treating a matrix comprising a frame having a plurality of closely spaced parallel bars secured therein, said frame and bars being machined to provide substantially plane top and bottom surfaces, said plate being adapted to cooperate with a platen of the matrix press and a platen of the drying press, said plate being of a weight to keep the matrix under sufficient pressure to permit transferring the form and matrix from the matrix press to the drying press without loss of registration of the matrix and printing surfaces.

8. In an apparatus for making matrices comprising in combination a press having a top platen, a printing form on which a matrix paper and a soft backing material are to be placed in superposed relationship, a plate adapted to cooperate with a platen of the matrix press and a platen of the drying press, said plate being of a weight to keep the matrix under sufficient pressure to permit transferring the form and matrix from the matrix press to the drying press without loss of registration of the matrix and printing surfaces, said plate being provided with a set of channels in its lower surface, means to connect said channels to a source of suction, a vacuum plate having a set of parallel channels communicating with said first channels, whereby suction is distributed over said backing by said last channels.

9. The method of making a matrix which comprises putting a moist matrix, backing material, and a vacuum plate on a printing form, inserting the assembly in a matrix press and pressing to form the matrix, removing the assembly from the matrix press and, with the vacuum plate still in position to keep the matrix in registration with the printing form, inserting the same in a drying press, connecting a source of suction to the vacuum plate and simultaneously applying heat, suction and mechanical pressure to remove the moisture from the matrix.

GEORGE W. BUNGAY.